United States Patent

[11] 3,578,122

[72] Inventor Roger Magnier
     Billancourt, France
[21] Appl. No. 806,778
[22] Filed Mar. 5, 1969
[45] Patented May 11, 1971
[73] Assignee Regie Nationale des Usines Renault Billancourt, France and Automobiles Peugeot Paris, France

[54] GROOVED SINTERED METAL SYNCHROMESH RING
     5 Claims, 4 Drawing Figs.
[52] U.S. Cl.................................................. 192/107,
                                                192/53, 192/113
[51] Int. Cl....................................................F16d 13/66,
                                                       F16d 13/72
[50] Field of Search............................................ 192/53.2,
                                  53.5, 53.6, 107, 113.2, 66, 53.3

[56]                References Cited
              UNITED STATES PATENTS
2,134,315  10/1938  Osborne........................   192/53.7
2,319,740   5/1943  Lapsley et al.................   192/107X
2,533,480  12/1950  Leininger et al..............   192/107
2,965,205  12/1960  Winchell......................   192/107X
              FOREIGN PATENTS
  945,445   1/1964  Great Britain................   192/53.6

Primary Examiner—Benjamin W. Wyche
Attorney—Stevens, Davis, Miller & Mosher

ABSTRACT: Splined synchromesh ring of sintered metal for transmission mechanism wherein relatively narrow splines are disposed in the direction of the generatrices of the inner tapered surface, characterized in that said nonmachined splines are compression-calibrated and arranged by groups, and that a relatively shallow depression is provided between two adjacent splines of the same group.

PATENTED MAY 11 1971
3,578,122
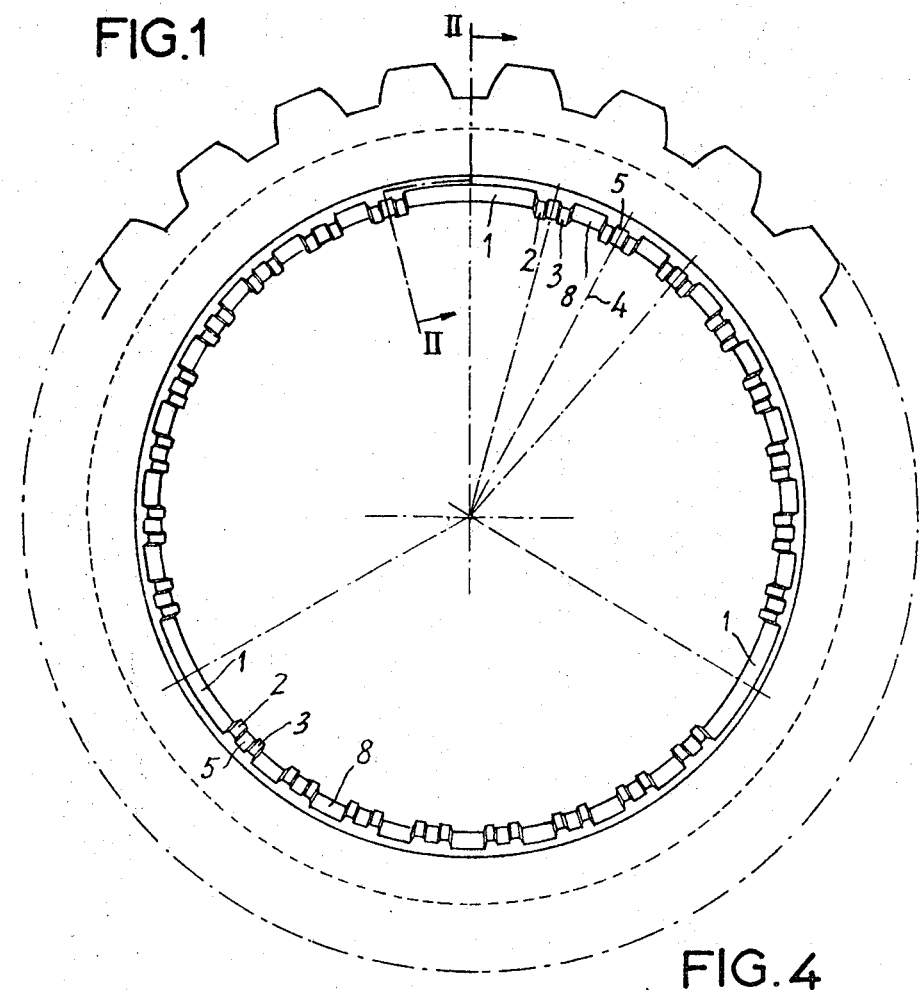
FIG.1
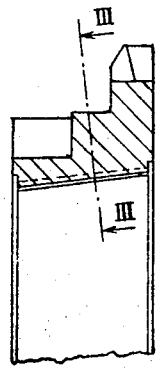
FIG.2
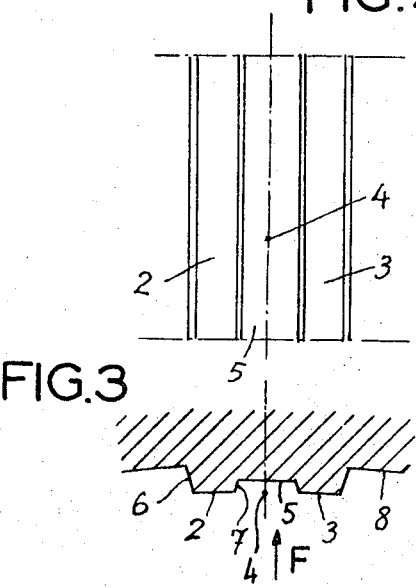
FIG.4
FIG.3
INVENTOR
ROGER MAGNIER
By Stevens, Davis, Miller & Mosher
ATTORNEYS

GROOVED SINTERED METAL SYNCHROMESH RING

The present invention relates to synchromesh rings for equipping change-speed transmission mechanisms and has specific reference to a ring of this character which is made of sintered metal. Rings of this general type are well known, for example, see FIG. 9 of U.S. Pat. No. 2,221,893 to White issued Nov. 19, 1940, and FIG. 6 of U.S. Pat. No. 3,080,028 Kennedy issued Mar. 5, 1963.

Copper alloy synchromesh rings are already known in the art wherein the tapered contact surface comprises, as a rule, a thin thread of which the top is intended for transmitting the torque and is broken by transverse notches to permit the removal of oil therefrom. Machining this thread constitutes a delicate and time-robbing operation, and is therefore inconsistent with the use of sintered metals, due to the lack of coherence of these metals. When using sintered metals it is desirable to preserve the contact surface in its rough-sintered or rough-calibrated condition.

The synchromesh ring according to this invention consists of sintered metal and comprises relatively narrow splines disposed according to the generatrix of the tapered surface and is characterized in that said relatively narrow splines, which are not machined and V-shaped to a precise geometrical configuration without removing material therefrom, are divided into separate groups, and that a shallow depression is provided between two adjacent splines of the same group.

The synchromesh ring thus constructed affords an accurate compression calibration of the component elements of the tapered surface because each group is divided into a plurality of narrow splines having a maximum deformability, without compromising the surface cohesion. The inclination of the lateral faces of these splines assists in preserving the sharp edges thereof, and angular magnitude of this inclination is consistent with each type of sintered material with a view to promote the compressibility of the splines while insuring a maximum cohesion and density of said edges. This arrangement is characterized by the following advantages:

The useful or working surfaces of the splines are not machined but calibrated by compression. Therefore, they display the highest desirable mechanical property as far as friction and wear are concerned, i.e. maximum density and hardness. Moreover, the geometrical and surface properties are not impaired by the machining of an element; therefore, cost is minimized since the part is mounted without any subsequent finishing operation. However, a geometrically perfect part may be obtained by honing or slightly grinding same, without detrimentally affecting the frictional property of the surface.

The torque is transmitted by causing the tapered surfaces of the splines to engage the homologous surface of the sliding hub or like member of the transmission mechanism, since any oil present therebetween was wiped off by the adjacent spline and removed by the depression provided between any pair of adjacent splines. Thus, torque is transmitted immediately as the tapered surfaces engage each other, the division of the tapered surface of the synchromesh ring causing the oil to be removed at a glance. If slip were indulged in, this would give time to the sliding hub or equivalent member to clear the so-called "preventer" ramps giving the certainty that the desired gear ratio is engaged only after the elements to be drivingly interconnected are duly synchronized according to a sequence of known operations.

A typical form of embodiment of a synchromesh ring according to this invention will now be described by way of example with reference to the attached drawing, in which:

FIG. 1 is a front elevational view of the ring;
FIG. 2 is a fragmentary section taken along the line II–II of FIG. 1;
FIG. 3 is another fragmentary section taken along the line III–III, showing more particularly the inclined splines of FIG. 2; and
FIG. 4 is a fragmentary view showing the splines when seen in the direction of the arrow F of FIG. 3.

Referring now to the drawing, it will be seen that the tapered surface 1 consists of groups or pairs of splines 2, 3 disposed along the generatrices 4 of the cone. The number of splines in a group may vary as a function of the grade of the lubricating oil utilized in the mechanism and also of the dimensions of this mechanism. Between the adjacent splines 2 and 3 of the same group or pair is a relatively shallow depression or cavity 5. The lateral faces 6 and 7 of splines 2 and 3 are inclined. An oil passage or groove 8 is provided between the adjacent groups or pairs of splines 2 and 3. The improved efficiency of the synchromesh ring according to this invention is due to the following properties:

i. a reduced contact area,
ii. the close-spaced arrangement of adjacent, narrow splines adapted immediately to break the oil film,
iii. the relatively large cross-sectional passage area available between adjacent groups or pairs of splines, which ensures a rapid "sweeping" of the contact surfaces, and
iv. the suppression of oil deadlocks detrimental to the proper torque-transmission efficiency of the synchromesh ring, due to the provision of sharp edges limiting these splines.

I claim:

1. A synchromesh ring of sintered, nonmachined material for transmissions and the like, said ring comprising a conically formed portion, a plurality of integral splines disposed along the generatrices of said conically formed portion, said splines being relatively narrow in width and arranged in groups of splines, and a shallow hollow formed between adjacent splines of each said group, the inner tapered surface of each said spline being formed through a finishing compression calibration operation.

2. A splined synchromesh ring of sintered metal for transmissions and the like comprising a plurality of relatively narrow, nonmachined splines disposed in the direction of the generatrices of an inner tapered surface, said splines being compression-calibrated and arranged in groups, and a relatively shallow depression provided between adjacent splines of the same group.

3. A splined synchromesh ring according to claim 1, further comprising a groove of relatively considerable cross-sectional area provided between adjacent groups of splines to promote the rapid removal of any oil film when the tapered surfaces of the synchromesh ring and its companion sliding hub are in mutual, torque-transmitting engagement.

4. A splined synchromesh ring according to claim 1, wherein said splines are limited laterally by inclined faces of which the angle is consistent with the ring material in order to obtain sharp edges after the compression calibration of said splines.

5. A splined synchromesh ring according to claim 1, wherein the number of splines per group is varied as a function of the sizeability of the materials involved and also of the grade of the lubricating oils utilized in the mechanism.